United States Patent
Kurokawa (10) Patent No.: US 11,226,611 B2
(45) Date of Patent: Jan. 18, 2022

(54) CONTROL DEVICE, CONTROL METHOD, AND CONTROL PROGRAM

(71) Applicant: OMRON Corporation, Kyoto (JP)

(72) Inventor: Yoichi Kurokawa, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/643,834

(22) PCT Filed: Dec. 20, 2018

(86) PCT No.: PCT/JP2018/046988
§ 371 (c)(1),
(2) Date: Mar. 2, 2020

(87) PCT Pub. No.: WO2019/142587
PCT Pub. Date: Jul. 25, 2019

(65) Prior Publication Data
US 2021/0064004 A1   Mar. 4, 2021

(30) Foreign Application Priority Data

Jan. 22, 2018 (JP) .............................. JP2018-008339

(51) Int. Cl.
*G05B 19/4155* (2006.01)
*H04L 12/26* (2006.01)
*H04L 29/08* (2006.01)

(52) U.S. Cl.
CPC ........ *G05B 19/4155* (2013.01); *H04L 43/028* (2013.01); *H04L 67/141* (2013.01); *G05B 2219/31347* (2013.01)

(58) Field of Classification Search
CPC ...... G05B 19/4155; G05B 2219/31347; H04L 43/028; H04L 67/141
See application file for complete search history.

(56) References Cited

U.S. PATENT DOCUMENTS

| 6,681,139 B1 | 1/2004 | Ohashi et al. |
| 2003/0114109 A1 | 6/2003 | Thayer et al. |

(Continued)

FOREIGN PATENT DOCUMENTS

| EP | 2400708 A1 | 12/2011 |
| JP | H08-221108 A | 8/1996 |

(Continued)

OTHER PUBLICATIONS

An English translation of the International Search Report("ISR") of PCT/JP2018/046988 dated Mar. 12, 2019.

(Continued)

*Primary Examiner* — Christopher B Robinson
(74) *Attorney, Agent, or Firm* — Metrolex IP Law Group, PLLC (57) ABSTRACT

A control device includes: a physical first communication port that connects to a first network—to which an information processing device belongs; a physical second communication port that connects to a second network to which the drive device belongs; and a storage device that stores a user program created for controlling the drive device. The user program includes a filtering function for switching a filtering condition in accordance with a setting for the filtering condition that is input during execution of the user program. The filtering condition is used for determining whether or not to transmit communication data received from one device to another device. The one device is one of the drive device and the information processing device. The other device is the other of the drive device and the information processing device.

19 Claims, 7 Drawing Sheets

(56) References Cited

U.S. PATENT DOCUMENTS

| | | | |
|---|---|---|---|
| 2006/0085839 A1 | 4/2006 | Brandt et al. | |
| 2010/0165878 A1 | 7/2010 | Soni | |
| 2010/0235499 A1 | 9/2010 | Maki | |
| 2012/0179776 A1* | 7/2012 | Umezuki | H04L 49/357 709/217 |
| 2012/0198541 A1 | 8/2012 | Reeves | |
| 2013/0100848 A1* | 4/2013 | Falk | H04W 12/00 370/252 |
| 2016/0248619 A1* | 8/2016 | Itkin | H04L 43/028 |
| 2017/0310502 A1 | 10/2017 | Shimizu et al. | |
| 2019/0050414 A1* | 2/2019 | Maturana | G06F 16/164 |

FOREIGN PATENT DOCUMENTS

| | | |
|---|---|---|
| JP | 2000-029849 A | 1/2000 |
| JP | 2002-268961 A | 9/2002 |
| JP | 2003-244243 A | 8/2003 |
| JP | 2005-513542 A | 5/2005 |
| JP | 2006-099777 A | 4/2006 |
| JP | 2010-212961 A | 9/2010 |
| JP | 2013-143077 A | 7/2013 |
| JP | 2016-034066 A | 3/2016 |
| JP | 2017-199154 A | 11/2017 |
| WO | 2016/018622 A1 | 2/2016 |

OTHER PUBLICATIONS

The Written Opinion("WO") of PCT/JP2018/046988 dated Mar. 12, 2019.

Office Action (JPOA) dated Jul. 13, 2021 in a counterpart Japanese patent application.

Extended European search report (EESR) dated Sep. 1, 2021 in a counterpart European patent application.

Office Action (JPOA) dated Dec. 7, 2021 in a basic Japanese patent application.

* cited by examiner

CONTROL DEVICE, CONTROL METHOD, AND CONTROL PROGRAM

TECHNICAL FIELD

The present disclosure relates to a technique for filtering communication data by a control device.

BACKGROUND ART

In various production sites, industrial control devices (hereinafter also referred to as "controllers") have been introduced, such as programmable logic controllers (PLCs) and robot controllers. Such controllers can control various industrial drive devices, thus automating the production process.

In recent years, a controller connectable to a plurality of different networks has become widespread. Such a controller serves as a gateway and manages the exchange of communication data between a higher-level network and a lower-level network.

With regard to such a controller, Japanese Patent Laying-Open No. 2017-199154 (PTL 1) discloses an equipment system which allows mutual connection of different networks and also allows easy setting for mutual control of various processing machines connected to the different networks.

CITATION LIST

Patent Literature

PTL 1: Japanese Patent Laying-Open No. 2017-199154

SUMMARY OF INVENTION

Technical Problem

For the sake of security, the controller allows passage of only the communication data that satisfies a set filtering condition. The communication data that should be allowed to pass changes depending on the situation. Accordingly, it is desired that the filtering condition be changed appropriately depending on the situation.

Example methods for changing the filtering condition for communication data include changing a network setting after stopping the drive devices in a factory automation (FA) system. Stopping the drive devices in an FA system, however, would result in a great opportunity loss. Thus, it is desired that a stop of FA system be avoided as much as possible when the filtering condition is changed.

The present disclosure has been made to solve such a problem. An object of the present disclosure in one aspect is to provide a technique that can change a filtering condition for communication data without stopping a drive device.

Solution to Problem

In an example of the present disclosure, a control device that controls a drive device comprises: a physical first communication port that connects to a first network to which an information processing device belongs; a physical second communication port that connects to a second network to which the drive device belongs; and a storage device that stores a user program created for controlling the drive device. The user program includes a filtering function for switching a filtering condition in accordance with a setting for the filtering condition that is input during execution of the user program. The filtering condition is used for determining whether or not to transmit communication data received from one device to another device. The one device is one of the drive device and the information processing device, and the other device is the other of the drive device and the information processing device.

According to this disclosure, since the filtering function is defined to receive a setting for the filtering condition that is input during execution of the user program, the control device can change the filtering condition for communication data without stopping the drive device.

In an example of the present disclosure, the setting for the filtering condition that is input includes a setting for specifying whether or not to execute a process for changing the filtering condition.

According to this disclosure, the control device can adjust the timing of execution of the filtering condition arbitrarily during driving of the drive device.

In an example of the present disclosure, the setting for the filtering condition that is input includes a setting for specifying an operation mode of the filtering function when the filtering condition is satisfied. The operation mode includes a mode in which only the communication data received from the one device is transmitted to the other device, and a mode in which the communication data received from the one device is not transmitted to the other device.

According to this disclosure, the control device can switch the operation mode of the filtering function, even during driving of the drive device.

In an example of the present disclosure, the setting for the filtering condition that is input includes a setting for specifying whether transmission of the communication data received from the drive device is to be filtered, or the communication data received from the information processing device is to be filtered.

According to this disclosure, the control device can appropriately switch the communication direction of the communication data to be filtered, even during driving of the drive device.

In an example of the present disclosure, the setting for the filtering condition that is input includes a setting for specifying a communication protocol for the communication data to be filtered.

According to this disclosure, the control device can switch the communication protocol for an object of filtering, even during driving of the drive device.

In an example of the present disclosure, the setting for the filtering condition that is input includes at least one of a setting for specifying a destination of the communication data received from the one device, and a setting for specifying a source of the communication data received from the one device.

According to this disclosure, the control device can appropriately switch the source device or destination device to be filtered, even during driving of the drive device.

In another example of the present disclosure, a control method for a control device that controls a drive device comprises: establishing communication with an information processing device that belongs to a first network; establishing communication with the drive device that belongs to a second network; executing, by the control device, a user program created for controlling the drive device; and switching, by the user program, a filtering condition in accordance with a setting for the filtering condition that is input during execution of the user program, the filtering condition being used for determining whether or not to transmit communication data received from one device to another device, the one device being one of the drive device and the information processing device, the other device being the other of the drive device and the information processing device.

According to this disclosure, since the filtering function is defined to receive a setting for the filtering condition that is input during execution of the user program, the control device can change the filtering condition for communication data without stopping the drive device.

In another example of the present disclosure, a control program for a control device that controls a drive device causes the control device to execute: establishing communication with an information processing device that belongs to a first network; establishing communication with the drive device that belongs to a second network; executing a user program created for controlling the drive device; and switching a filtering condition in accordance with a setting for the filtering condition that is input during execution of the user program, the filtering condition being used for determining whether or not to transmit communication data received from one device to another device, the one device being one of the drive device and the information processing device, the other device being the other of the drive device and the information processing device.

According to this disclosure, since the filtering function is defined to receive a setting for the filtering condition that is input during execution of the user program, the control device can change the filtering condition for communication data without stopping the drive device.

Advantageous Effects of Invention

In one aspect, the filtering condition for communication data can be changed without stopping a drive device.

DESCRIPTION OF EMBODIMENTS

An Embodiment of the present invention will now be described with reference to the drawings. In the following description, like reference signs indicate like parts and components. Their names and functions are also the same. Hence, the detailed description of them is not repeated.

<A. Application>

Figure 1:
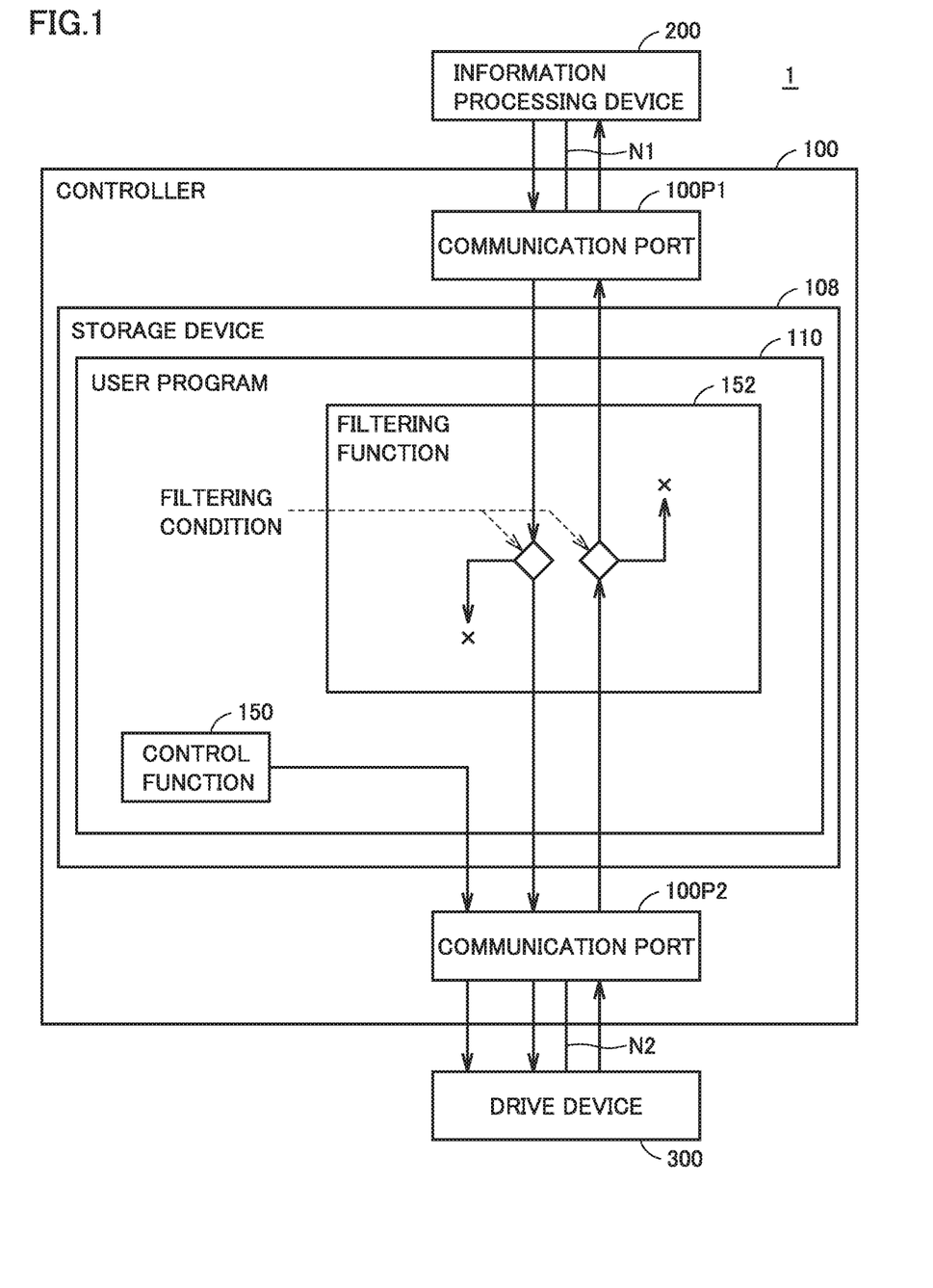
FIG. 1 is a diagram showing a configuration example of an FA system according to an embodiment.

With reference to FIG. 1, an application of the present invention is described. FIG. 1 is a diagram showing a configuration example of FA system 1.

FA system 1 is a system for controlling an object of control, such as an apparatus and equipment, and automating the production process. FA system 1 includes one or more controllers 100, one or more information processing devices 200, and one or more drive devices 300. Controller 100 includes physical communication ports 100P1, 100P2 and a storage device 108.

Controller 100 is connectable to a plurality of networks. In the example of FIG. 1, communication port 100P1 (first communication port) is connected to a network N1 (first network), and communication port 100P2 (second communication port) is connected to a network N2 (second network).

For network N1, EtherNET (registered trademark) is employed, for example. However, network N1 is not limited to EtherNET, and any communication means can be employed. In the example of FIG. 1, information processing device 200 is connected to network N1. Examples of information processing device 200 include a personal computer (PC), a tablet terminal, a smartphone, and a display (e.g., a human machine interface (HMI)).

Network N2 is a lower-level network than network N1. For network N2, EtherNet/IP (registered trademark) is employed, for example. In the example of FIG. 1, drive device 300 is connected to network N2. Drive device 300 includes various industrial devices for automating the production process. By way of example, drive device 300 includes an arm robot, a robot controller for controlling the arm robot, an image sensor for imaging a workpiece conveyed during the production process, and other devices used in the production process.

Storage device 108 stores a user program 110. User program 110 is a control program implemented by a designer for drive device 300. A development tool for user program 110 is installed in information processing device 200, which is, for example, a PC. A designer can design user program 110 tailored to the configuration of drive device 300 by combining a plurality of types of predefined instructions on the development tool. The instructions that can be combined on the development tool include a control instruction for drive device 300 and a filtering instruction for communication data. User program 110 compiled on the development tool is installed in controller 100. In the example of FIG. 1, user program 110 includes a control function 150 for drive device 300 and a filtering function 152 for communication data.

In the example of FIG. 1, user program 110 includes control function 150 and filtering function 152. Each of control function 150 and filtering function 152 is typically a program.

Control function 150 outputs a control instruction to drive device 300 in accordance with the defined details of control. Filtering function 152 switches the filtering condition in accordance with the setting for filtering condition that is input during execution of user program 110, the filtering condition being used for determining whether or not to transmit communication data received from one device to the other device. The one device is one of information processing device 200 and drive device 300, and the other device is the other of information processing device 200 and drive device 300. Hereinafter, one of information processing device 200 and drive device 300 that serves as a source of communication data is also referred to as a "source device". One of information processing device 200 and drive device 300 that serves as a destination of communication data is also referred to as a "destination device".

Since filtering function 152 is defined to receive input of the setting for filtering condition, controller 100 can change the filtering condition for communication data without stopping drive device 300. Thus, controller 100 can appropriately switch the communication data to be filtered in accordance with the status of FA system 1.

The communication data to be filtered by filtering function 152 may be any type of data that is transmitted between different networks N1, N2. For example, the communication data to be filtered may be communication packets conforming to a communication protocol, such as TCP/IP, or may be frames transmitted over field networks.

Further, the filtering condition that can be set for filtering function 152 may be a single condition, or may be a plurality of conditions.

<B. Configuration of FA System 1>

Figure 2:
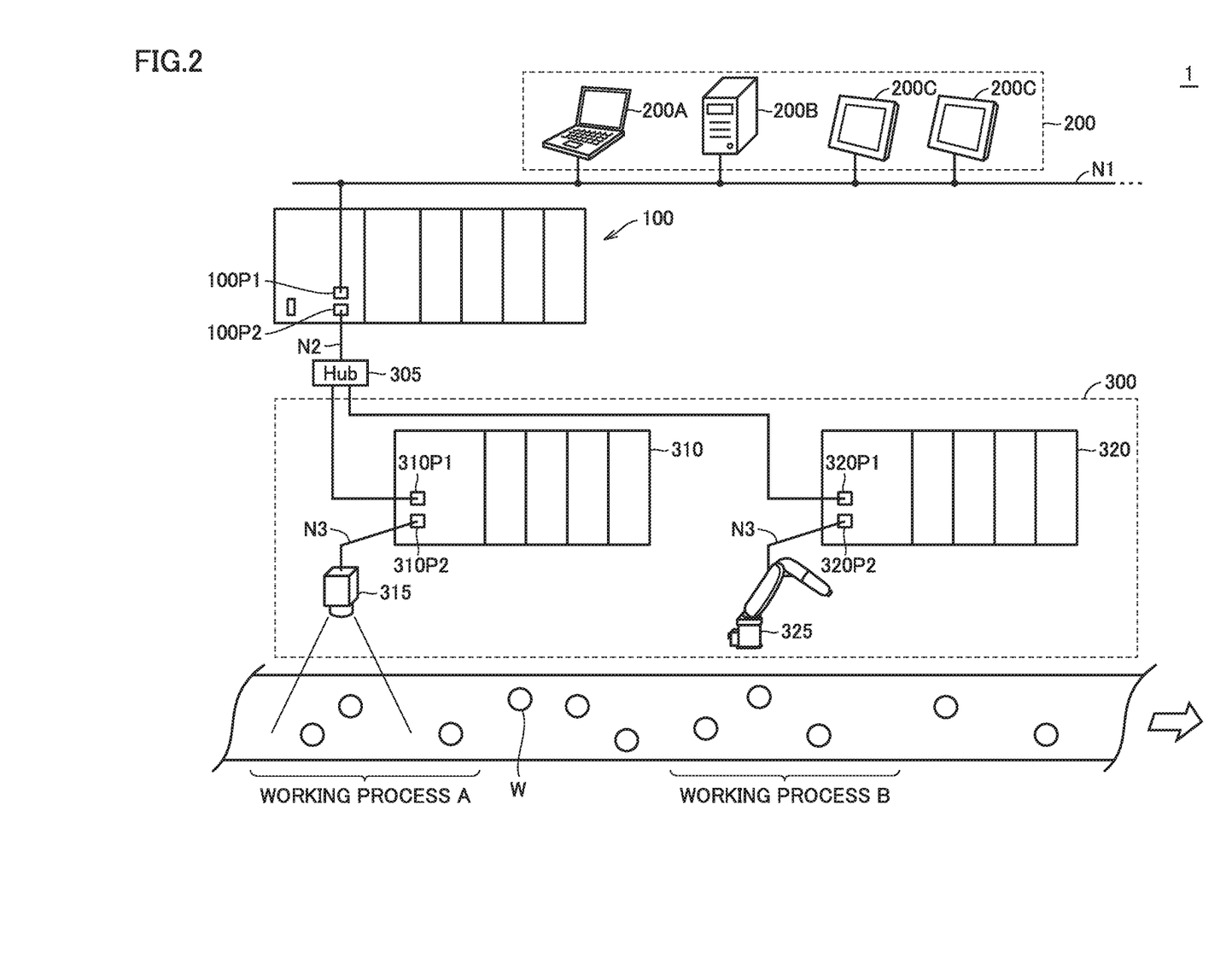
FIG. 2 is a schematic diagram showing a schematic configuration of an FA system 1 according to an embodiment.

The general configuration of FA system 1 according to the present embodiment will now be described. FIG. 2 is a schematic diagram showing a schematic configuration of FA system 1 according to the present embodiment.

As described above, FA system 1 includes one or more controllers 100, one or more information processing devices 200, and one or more drive devices 300.

Controller 100 is connectable to a plurality of networks. In the example of FIG. 2, controller 100 is connected to higher-level network N1 and lower-level network N2.

Higher-level network N1 includes information processing device 200 connected thereto. Information processing device 200 is a communication device connectable to network N1. As shown in FIG. 2, information processing device 200 is constituted of at least one of: one or more support devices 200A, one or more server devices 200B, and one or more displays 200C.

Support device 200A provides a designer with a development environment for designing user program 110. Support device 200A is, for example, a notebook PC, a desktop PC, a tablet terminal, a smartphone, or the like. A designer can design user program 110 on support device 200A and download user program 110 to controller 100 via network N1.

Server device 200B may be a database system, a manufacturing execution system (MES), or the like. The manufacturing execution system acquires information from a manufacturing apparatus or equipment to be controlled, thus monitoring and managing the whole production. The manufacturing execution system can handle order information, quality information, shipment information, or the like. This is, however, not a limitation. A device that provides an information-related service (a process for acquiring various types of information from an object of control and performing a macro or micro analysis) may be connected to network N1. The various types of information received by server device 200B from controller 100 can be an object to be filtered by filtering function 152 of controller 100 (see FIG. 1).

Display 200C receives a manipulation from the user and outputs, to controller 100, a command corresponding to the user's manipulation. The command output from display 200C can be an object to be filtered by filtering function 152 of controller 100 (see FIG. 1). Display 200C graphically represents the result of calculation at controller 100.

Lower-level network N2 includes drive device 300 connected thereto. Drive device 300 is a collection of devices for performing prescribed work on a workpiece W directly or indirectly. In the example of FIG. 2, drive device 300 is constituted of remote IO devices 310, 320, an image sensor 315, and an arm robot 325.

Remote IO device 310 has a plurality of physical communication ports. To the respective communication ports, different networks are connectable. In the example of FIG. 2, remote IO device 310 has two communication ports 310P1, 310P2. Network N2 is divided by a hub 305, one of which is connected to communication port 310P1. Communication port 310P2 has connection to a network N3. Network N3 is preferably a field network which performs fixed-cycle communication ensuring the data arrival time. Known examples of such field networks which perform fixed-cycle communication include EtherCAT (registered trademark) and CompoNet (registered trademark).

Remote IO device 310 controls image sensor 315 in accordance with a control command from controller 100. In response to the control command sent from remote IO device 310 to image sensor 315, image sensor 315 sequentially images workpieces W transported on a conveyor, and executes predetermined image processing on the obtained images. Thus, image sensor 315 sequentially performs quality inspection of workpieces W transported on the conveyor. The results of inspection by image sensor 315 are sequentially sent to controller 100 via remote IO device 310.

Remote IO device 320 has a plurality of physical communication ports. To the respective communication ports, different networks are connectable. In the example of FIG. 2, remote IO device 320 has two communication ports 320P1, 320P2. Network N2 is divided by hub 305, one of which is connected to communication port 320P1. Communication port 320P2 has connection to a network N3. Network N3 is preferably a field network which performs fixed-cycle communication ensuring the data arrival time. Known examples of such field networks which perform fixed-cycle communication include EtherCAT and CompoNet.

Remote IO device 320 controls arm robot 325 in accordance with a control command from controller 100. By way of example, in accordance with an inspection process (working process A) using image sensor 315, controller 100 outputs a control command to remote IO device 320 for causing arm robot 325 to perform prescribed work (working process B). In accordance with the control command, remote IO device 320 controls arm robot 325. By way of example, remote IO device 320 provides a control command to remove, from the conveyor, workpiece W condemned by the inspection. The status (e.g., the position and angle of each joint) of arm robot 325 is sequentially fed back from remote IO device 320 to controller 100.

<C. Function Block>

As described above, user program 110 includes filtering function 152 for switching a filtering condition in accordance with input of the setting for filtering condition, the filtering condition being used for determining whether or not to transmit communication data received from one device (i.e., source device) to the other device (i.e., destination device). The one device is one of information processing device 200 and drive device 300, and the other device is the other of information processing device 200 and drive device 300.

Filtering function 152 is a program (control instruction) for filtering communication data that passes controller 100, and may be defined by any of various types of programs. By way of example, filtering function 152 may be defined by a function block diagram (FBD).

The following description is on the assumption that filtering function 152 is defined by a function block. However, filtering function 152 may be defined by other program languages. By way of example, filtering function 152 may be defined by any of a ladder diagram (LD), an instruction list (IL), a structured text (ST), and a sequential function chart (SFC); or a combination thereof. Further alternatively, filtering function 152 may be defined by a general-purpose programming language, such as JavaScript (registered trademark) or C language.

Figure 3:
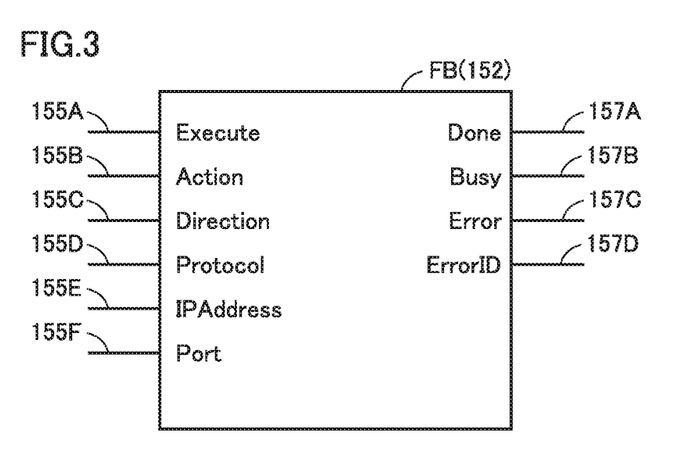
FIG. 3 is a diagram showing a filtering function defined by a function block.

FIG. 3 is a diagram showing filtering function 152 defined by a function block FB. As shown in FIG. 3, function block FB includes input parts 155A to 155F for receiving the setting of filtering condition, and output parts 157A to 157D for outputting the result of setting the filtering condition. Input parts 155A to 155F receive input of the setting for filtering condition of filtering function 152. That is, filtering function 152 switches the filtering condition in accordance with the values input to input parts 155A to 155F.

Input part 155A illustrated as "Execute" receives a setting for specifying whether or not to execute a process for changing the filtering condition. By way of example, input part 155A receives an input of "True" or "False". As long as "False" is input to input part 155A, filtering function 152 does not change the filtering condition. On the other hand, when "True" is input to input part 155A, a process for changing the filtering condition is executed. In this case, the filtering conditions that are input to other input parts 155B to 155F are set as new filtering conditions. Thus, controller 100 can adjust the timing of execution of the filtering condition arbitrarily during driving of drive device 300.

Input part 155B illustrated as "Action" receives a setting for specifying the operation mode of filtering function 152 when the filtering condition is satisfied. By way of example, input part 155B receives an input of "pass" or "block". When "pass" is input to input part 155B, filtering function 152 sets a filtering condition so that only the communication data that satisfies the filtering condition is allowed to pass. That is, in this case, only the communication data that satisfies the filtering condition is transmitted to the destination device, and other communication data is not transmitted to the destination device. On the other hand, when "block" is input to input part 155B, filtering function 152 sets a filtering condition so that communication data that satisfies the filtering condition is blocked. That is, in this case, only the communication data that satisfies the filtering condition is blocked, and other communication data is transmitted to the destination device. Thus, controller 100 can switch the operation mode of filtering function 152 appropriately in accordance with the value input to input part 155B, even during driving of drive device 300.

Input part 155C illustrated as "Direction" receives an input for specifying the communication direction of the communication data to be filtered. That is, input part 155C receives an input for specifying whether the transmission of communication data received from drive device 300 is to be filtered, or the communication data received from information processing device 200 is to be filtered. By way of example, input part 155C receives an input of "in" or "out". When "in" is input to input part 155C, filtering function 152 changes the filtering condition so that communication data transmitted from information processing device 200, which belongs to higher-level network N1, to drive device 300, which belongs to lower-level network N2, is to be filtered. When "out" is input to input part 155C, filtering function 152 changes the filtering condition so that communication data transmitted from drive device 300, which belongs to lower-level network N2, to information processing device 200, which belongs to higher-level network N1, is to be filtered. Thus, controller 100 can appropriately switch the communication direction of the communication data to be filtered, in accordance with the value input to input part 155C, even during driving of drive device 300.

Input part 155D illustrated as "Protocol" receives an input for specifying the communication protocol for the communication data to be filtered. By way of example, input part 155D receives an input of the identification information of the communication protocol. The identification information may be specified by the communication protocol name or communication protocol identification (ID). By way of example, input part 155D receives an input of "TCP" or "FTP". When "TCP" is input to input part 155D, filtering function 152 changes the filtering condition so that communication data conforming to a TCP protocol is to be filtered. When "FTP" is input to input part 155D, filtering function 152 changes the filtering condition so that communication data conforming to an FTP protocol is to be filtered. Thus, controller 100 can appropriately switch the communication protocol for an object of filtering, in accordance with the value input to input part 155D, even during driving of drive device 300.

The communication protocol specified as an object of filtering at input part 155D may be specified for higher-level network N1 or for lower-level network N2.

Input part 155E illustrated as "IP Address" receives an input for specifying the destination device. By way of example, the destination device is specified by the IP address. For example, when "10.0.0.1" is input to input part 155E, filtering function 152 changes the filtering condition so that communication data to be sent to the destination device having an IP address of "10.0.0.1" is to be filtered. Thus, controller 100 can appropriately switch the destination device to be filtered, in accordance with the value input to input part 155E, even during driving of drive device 300.

In the above-described example, the destination device of communication data can be specified at input part 155E. However, function block FB may instead be defined to specify the source device of communication data at input part 155E or other input parts.

Input part 155F illustrated as "Port" receives an input for specifying the port number of the destination device of communication data. By way of example, when "80" is input to input part 155F, filtering function 152 changes the filtering condition so that communication data to be sent to the port number "80" of the destination device is to be filtered. Thus, controller 100 can appropriately switch the port number to be filtered, in accordance with the value input to input part 155F, even during driving of drive device 300.

In the above-described example, the communication port of the destination device of communication data can be specified at input part 155F. However, function block FB may instead be defined to specify the port number of the source device of communication data at input part 155F or other input parts.

When the filtering condition has normally been set, a signal indicating normal termination is output from output part 157A illustrated as "Done". When the change of filtering condition is being performed, a signal indicating that the changing process is in progress is output from output part 157B illustrated as "Busy". When the filtering condition has not been normally set, a signal indicating abnormal termination is output from output part 157C illustrated as "Error". In this case, an error ID for identifying the details of the error is output from output part 157D illustrated as "ErrorID".

Function block FB may include various other input parts and output parts, in addition to input parts 155A to 155F and output parts 157A to 157D. By way of example, if a plurality of communication interfaces are provided, function block FB may further include an input part for specifying a communication interface. While function block FB receives only one filtering condition in the above-described example, function block FB may instead be defined to receive a plurality of filtering conditions.

<D. Example Program>

Figure 4:
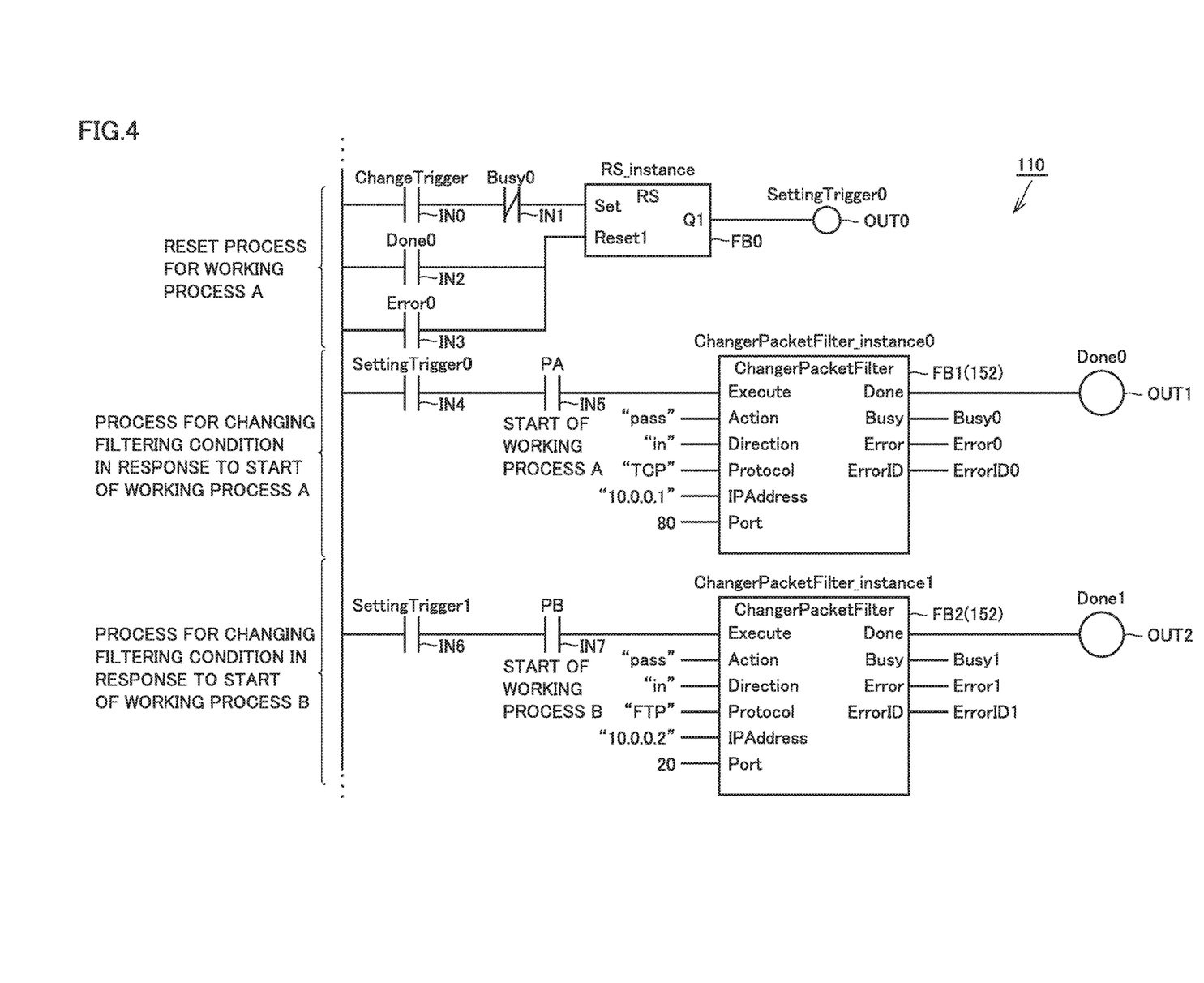
FIG. 4 is a diagram showing an example user program including the function block described in FIG. 3.

With reference to FIG. 4, a usage example of function block FB described in FIG. 3 will now be described. FIG. 4 is a diagram showing an example user program including function block FB described in FIG. 3.

In the example of FIG. 4, user program 110 is defined by a ladder program. User program 110 is defined so that the filtering condition for communication data is changed depending on the working process on a workpiece. User program 110 shown in FIG. 4 does not illustrate the whole process in controller 100. For example, a part of the logic at switching between working processes is omitted.

User program 110 is defined by input elements IN0 to IN7, function blocks FB0 to FB2, and output elements OUT0 to OUT2. Each of function blocks FB1, FB2 corresponds to function block FB having filtering function 152 described in FIG. 3.

The value of each of input elements IN0 to IN7 is switched in accordance with the assigned variable. Specifically, input element IN0 is assigned with a variable "ChangeTrigger". The variable "ChangeTrigger" is a Boolean data type and has a default value of "False" (=OFF). The value of the variable "ChangeTrigger" is switched to "True" (=ON) in response to the startup of controller 100. At other times, the value of the variable "ChangeTrigger" is "False" (=OFF).

Input element IN1 is assigned with a variable "Busy0". The variable "Busy0" is a Boolean data type. The variable "Busy0" is associated with the output "Busy" of function block FB1. Accordingly, the value of input element IN1 is switched in accordance with the value of the output "Busy" of function block FB1. As described above, during a change of filtering condition, a signal "True" (=ON) indicating that the changing process is in progress is output from the output "Busy" of function block FB1. The value of the variable "Busy0" at input element IN1 is opposite to the value of the output "Busy" of function block FB1. Therefore, when the output "Busy" of function block FB1 is "True" (=ON), the value of input element IN1 is "False" (=OFF). On the other hand, when the output "Busy" is "False" (=OFF), the value of input element IN1 is "True" (=ON).

Input element IN2 is assigned with a variable "Done0". The variable "Done0" is a Boolean data type and has a default value of "False" (=OFF). The variable "Done0" is associated with the output "Done" of function block FB1. As described above, when the filtering condition has been normally changed, a signal "True" (=ON) indicating normal termination is output from the output "Done" of function block FB1. When the output "Done" of function block FB1 is "True" (=ON), the value of input element IN2 is "True" (=ON). On the other hand, when the output "Done" of function block FB1 is "False" (=OFF), the value of input element IN2 is "False" (=OFF).

Input element IN3 is assigned with a variable "Error0". The variable "Error0" is a Boolean data type and has a default value of "False" (=OFF). The variable "Error0" is associated with the output "Error" of function block FB1. As described above, when the process for changing the filtering condition has been abnormally terminated, a signal "True" (=ON) indicating abnormality is output from the output "Error" of function block FB1. When the output "Error" of function block FB1 is "True" (=ON), the value of input element IN3 is "True" (=ON). On the other hand, when the output "Error" of function block FB1 is "False" (=OFF), the value of input element IN3 is "False" (=OFF).

Input element IN4 is assigned with a variable "SettingTrigger0". The variable "SettingTrigger0" is a Boolean data type and has a default value of "False" (=OFF). The variable "SettingTrigger0" is associated with the output "Q1" of function block FB0. When the output "Q1" of function block FB0 is "True" (=ON), the value of input element IN4 is "True" (=ON). On the other hand, when the output "Q1" of function block FB0 is "False" (=OFF), the value of input element IN4 is "False" (=OFF).

Input element IN5 is assigned with a variable "PA". The variable "PA" is a Boolean data type and has a default value of "False" (=OFF). Although not shown in FIG. 4, control function 150 for implementing working process A is defined in user program 110. Control function 150 is defined such that the value of the variable "PA" is "True" (=ON) when working process A is being executed, and that the value of the variable "PA" is "False" (=OFF) when working process A is not being executed.

Input element IN6 is assigned with a variable "SettingTrigger1". The variable "SettingTrigger1" is a Boolean data type and has a default value of "False" (=OFF). Although not shown in FIG. 4, a reset process for working process B is defined in user program 110, and the value of the variable "SettingTrigger1" is switched in accordance with the result of the reset process. The value of the variable "SettingTrigger1" becomes "True" (=ON) in response to the termination of the reset process which is executed at the start of working process B. As a result, the value of input element IN6 becomes "True" (=ON). On the other hand, when the value of the variable "SettingTrigger1" becomes "False" (=OFF), the value of input element IN6 becomes "False" (=OFF).

Input element IN7 is assigned with a variable "PB". The variable "PB" is a Boolean data type and has a default value of "False" (=OFF). Although not shown in FIG. 4, control function 150 for implementing working process B is defined in user program 110. Control function 150 is defined such that the value of the variable "PB" is "True" (=ON) when working process B is being executed, and that the value of the variable "PB" is "False" (=OFF) when working process B is not being executed.

Function block FB0 is a program for executing the reset process which is executed at the start of working process A. Function block FB0 has input parts "Set", "Reset1", and an output part "Q1". When the variable "ChangeTrigger" becomes "True" (=ON) and the variable "Busy0" becomes "False" (=OFF), a signal "True" (=ON) indicating "enable" is input to the input part "Set". At other times, a signal "False" (=OFF) indicating "disable" is input to the input part "Set". When the variable "Done0" becomes "True" (=ON), or when the variable "Error0" becomes "True" (=ON), a signal "True" (=ON) indicating "enable" is input to the input part "Reset1". At other times, a signal "False" (=OFF) indicating "disable" is input to the input part "Reset1". In response to a signal indicating "enable" being input to both the input parts "Set" and "Reset1", function block FB0 starts the reset process for working process A. When the reset process is normally terminated, the value of the output part "Q1" of function block FB0 becomes "True" (=ON).

Function block FB1 is a program for changing the filtering condition for communication data. In response to the variable "SettingTrigger0" becoming "True" (=ON) and the variable "PA" becoming "True" (=ON), a signal "True" (=ON) indicating "enable" is input to the input part "Execute" of function block FB1. In response to this, function block FB1 executes the process for changing the filtering condition.

Specifically, function block FB1 sets, as a new filtering condition, the filtering condition according to "pass" input to the input part "Action", "in" input to the input part "Direction", "TCP" input to the input part "Protocol", "10.0.0.1" input to the input part "IP Address", and "80" input to the input part "Port". The method for changing the filtering condition has already been described in detail in FIG. 3, and thus the description thereof is not repeated.

Function block FB2 is a program for changing the filtering condition for communication data. In response to the variable "SettingTrigger1" becoming "True" (=ON) and the variable "PB" becoming "True" (=ON), a signal "True" (=ON) indicating "enable" is input to the input part "Execute" of function block FB2. In response to this, function block FB2 executes the process for changing the filtering condition.

Specifically, function block FB2 sets, as a new filtering condition, the filtering condition according to "pass" input to the input part "Action", "in" input to the input part "Direction", "FTP" input to the input part "Protocol", "10.0.0.2" input to the input part "IP Address", and "20" input to the input part "Port". The method for changing the filtering condition has already been described in detail in FIG. 3, and thus the description thereof is not repeated.

The value of each of output elements OUT0 to OUT2 is switched in accordance with the output value of an associated function block. Output element OUT0 is assigned with a variable "SettingTrigger0". Output element OUT0 is also associated with the output "Q1" of function block FB0. As a result, the value of output element OUT0 is switched in accordance with the value of the output "Q1".

Output element OUT1 is assigned with a variable "Done0". Output element OUT1 is also associated with the output "Done" of function block FB1. As a result, the value of output element OUT1 is switched in accordance with the value of the output "Done" of function block FB1.

Output element OUT2 is assigned with a variable "Done1". Output element OUT2 is also associated with the output "Done" of function block FB2. As a result, the value of output element OUT2 is switched in accordance with the value of the output "Done" of function block FB2.

As described above, a filtering condition that is input to function block FB1 is set for working process A, while a filtering condition that is input to function block FB2 is set for working process B. In this way, the filtering condition is changed appropriately depending on the working process. The filtering condition, if fixed, would have to be set such that communication data required to pass for working process A and communication data required to pass for working process B are both allowed to pass all the time. By contrast, user program 110 shown in FIG. 4 eliminates the need for that.

In the above-described example, the filtering condition can be changed depending on the working process. However, user program 110 may be defined to change the filtering condition depending on other situations. By way of example, user program 110 may be defined to, when the configuration of drive device 300 in FA system 1 has changed, set a filtering condition tailored to the configuration of FA system 1. In this case, when an unintended communication device is connected to controller 100 for example, controller 100 can block the communication device. For detecting connection/disconnection of a communication device, a function block that monitors the network status may be used, for example. Such a function block regularly monitors the status of a network table and detects connection/disconnection of a communication device from the information on a change of the network table.

As another example, user program 110 may be defined to, upon a malicious attack from an external device, set a filtering condition for preventing the malicious attack. By way of example, a communication driver of controller 100 monitors the amount of reception data per unit time (e.g., the packet count received per unit time), and, when the amount of reception data exceeds a prescribed threshold value, determines the presence of a malicious attack from an external device. When a malicious attack from an external device is detected, filtering function 152 blocks the external device that is delivering the malicious attack, based on the IP address, the port number, or other information. Alternatively, when a malicious attack from an external device is detected, filtering function 152 may block the reception of all communication packets.

As another example, user program 110 may be defined to, when the connection status of communication of controller 100 has changed, set a filtering condition tailored to the connection status. For example, filtering function 152 allows passage of the reception data from a source device only during a period from the establishment of communication with the source device, to the disconnection. At other times, filtering function 152 blocks the reception data from the source device. Thus, filtering function 152 can allow passage of communication data only during a necessary period of time, thereby enhancing security.

The above description is on the assumption that the input parts "Action", "pass", "Direction", "Protocol", "IP Address", and "Port" of function blocks FB1, FB2 receive input of fixed values. However, these input parts may receive input of variables instead.

<E. Data Structure of Communication Data>

Controller 100 determines whether or not to filter communication data received from a source device, depending on whether or not the received communication data satisfies a filtering condition. Typically, the information for determining whether or not to filter communication data is defined in the communication data.

By way of example, the communication data includes at least one of: the identification information (e.g., IP address or MAC address) of the source device, the port number of the destination device, the communication protocol used when the communication data was received, the identification information (e.g., IP address or MAC address) of the destination device, the port number of the source device, and the communication protocol used when the communication data was transmitted. Controller 100 extracts such information from the communication data, and determines whether or not to filter the communication data, depending on whether or not the information matches the filtering condition.

The communication data to be filtered by controller 100 may be any type of communication data that can be transmitted between different networks. The following describes an example of communication data to be filtered by controller 100 with reference to FIG. 5.

Figure 5:
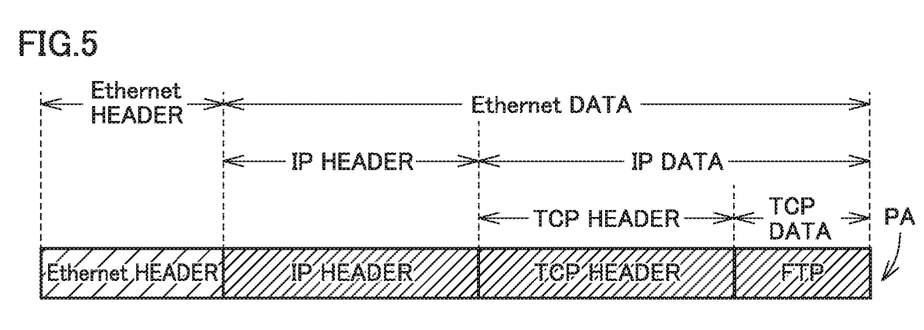
FIG. 5 is a diagram showing the data structure of a communication packet conforming to a TCP/IP protocol.

The communication data to be filtered by controller 100 includes, for example, a communication packet conforming to a TCP/IP protocol. FIG. 5 is a diagram showing the data structure of a communication packet conforming to a TCP/IP protocol.

The source device divides the data to be transmitted into a plurality of communication packets and sequentially transmits the communication packets to controller 100. FIG. 5 shows a communication packet PA, which is one of the communication packets divided by the source device.

Communication packet PA is constituted of an Ethernet header, which is a header part of the Ethernet protocol, and Ethernet data, which is a data part of the Ethernet protocol. The Ethernet data is constituted of an IP header, which is a header part of the IP protocol, and IP data, which is a data part of the IP protocol. The IP data is constituted of a TCP header, which is a header part of the TCP protocol, and TCP data, which is a data part of the TCP protocol.

The IP header of communication packet PA includes the IP address of the source device, the IP address of the destination device, and the communication protocol. The TCP header of communication packet PA includes the port number of the source device and the port number of the destination device. The TCP data of communication packet PA includes the content of the data to be transmitted. The data to be transmitted includes, for example, various variables representing the status of drive device 300, and instructions of information processing device 200 to acquire various variables. As used herein, the variables refer to the various variables contained in user program 110. The variables are changed depending on the statuses of various components of drive device 300.

In response to receiving communication packet PA, controller 100 extracts, from communication packet PA, the information to be compared with the filtering condition. The information includes, for example, at least one of: the IP address of the source device, the IP address of the destination device, the communication protocol, the port number of the source device, and the port number of the destination device. Controller 100 determines whether or not the information extracted from communication packet PA satisfies the filtering condition. When determining that the information extracted from communication packet PA satisfies the filtering condition, controller 100 determines that communication packet PA is to be filtered.

<F. Hardware Configuration of Controller 100>

Figure 6:
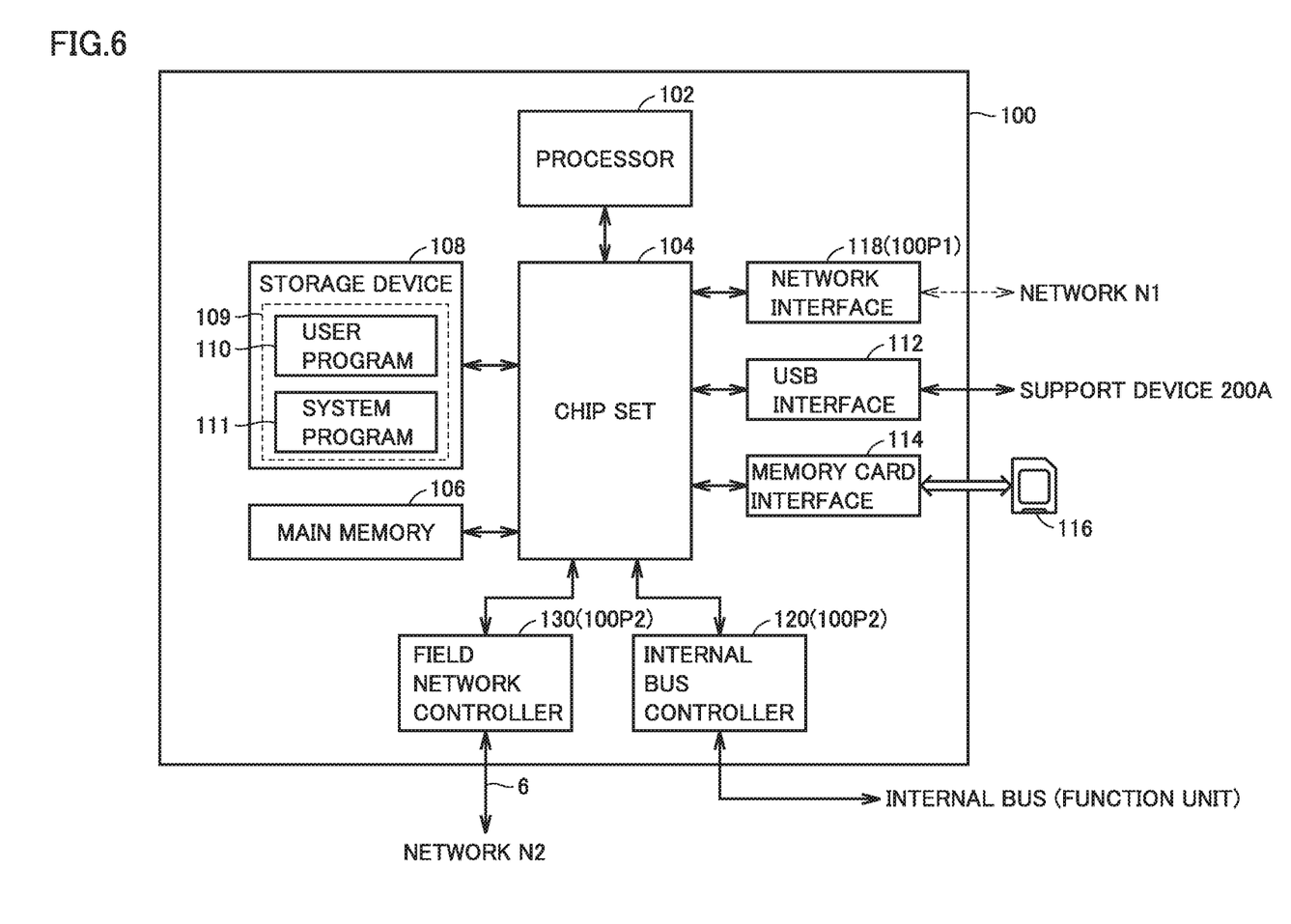
FIG. 6 is a block diagram showing a hardware configuration example of a controller according to an embodiment.

FIG. 6 is a block diagram showing a hardware configuration example of controller 100. With reference to FIG. 6, controller 100 includes a processor 102, a chip set 104, a main memory 106, a storage device 108, a universal serial bus (USB) interface 112, a memory card interface 114, a network interface 118, an internal bus controller 120, and a field network controller 130.

Processor 102 is configured with, for example, a central processing unit (CPU), a micro processing unit (MPU), and a graphics processing unit (GPU). Processor 102 may be constituted of a plurality of cores, or a plurality of processors 102 may be provided. Thus, controller 100 includes one or more processors 102 and/or processor 102 having one or more cores. Chip set 104 controls processor 102 and peripheral elements to implement the processes of overall controller 100. Main memory 106 is configured with, for example, a volatile storage device, such as a dynamic random access memory (DRAM) and a static random access memory (SRAM). Storage device 108 is configured with, for example, a nonvolatile storage device, such as a flash memory.

Processor 102 reads various programs stored in storage device 108 and develops the programs in main memory 106 for execution, thereby implementing the control tailored to an object of control. Storage device 108 stores a control program 109 of controller 100. Control program 109 includes user program 110 created to be tailored to a manufacturing apparatus or equipment to be controlled, as well as a system program 111 for implementing basic processes.

USB interface 112 interfaces the data communication via USB connection with an external device (e.g., a support device for developing the user program).

Memory card interface 114 is configured to removably receive a memory card 116 and can write data to memory card 116 and read various types of data (e.g., the user program and trace data) from memory card 116.

Network interface 118 can interface the data communication via network N1.

Internal bus controller 120 interfaces the data communication with a function unit attached to controller 100. Field network controller 130 interfaces the data communication with other units via network N2.

FIG. 6 shows a configuration example in which necessary processes are implemented by processor 102 executing programs. However, a part or all of the processes provided may be implemented using a dedicated hardware circuit (e.g., ASIC or FPGA), instead.

<G. Control Structure of Controller 100>

Figure 7:
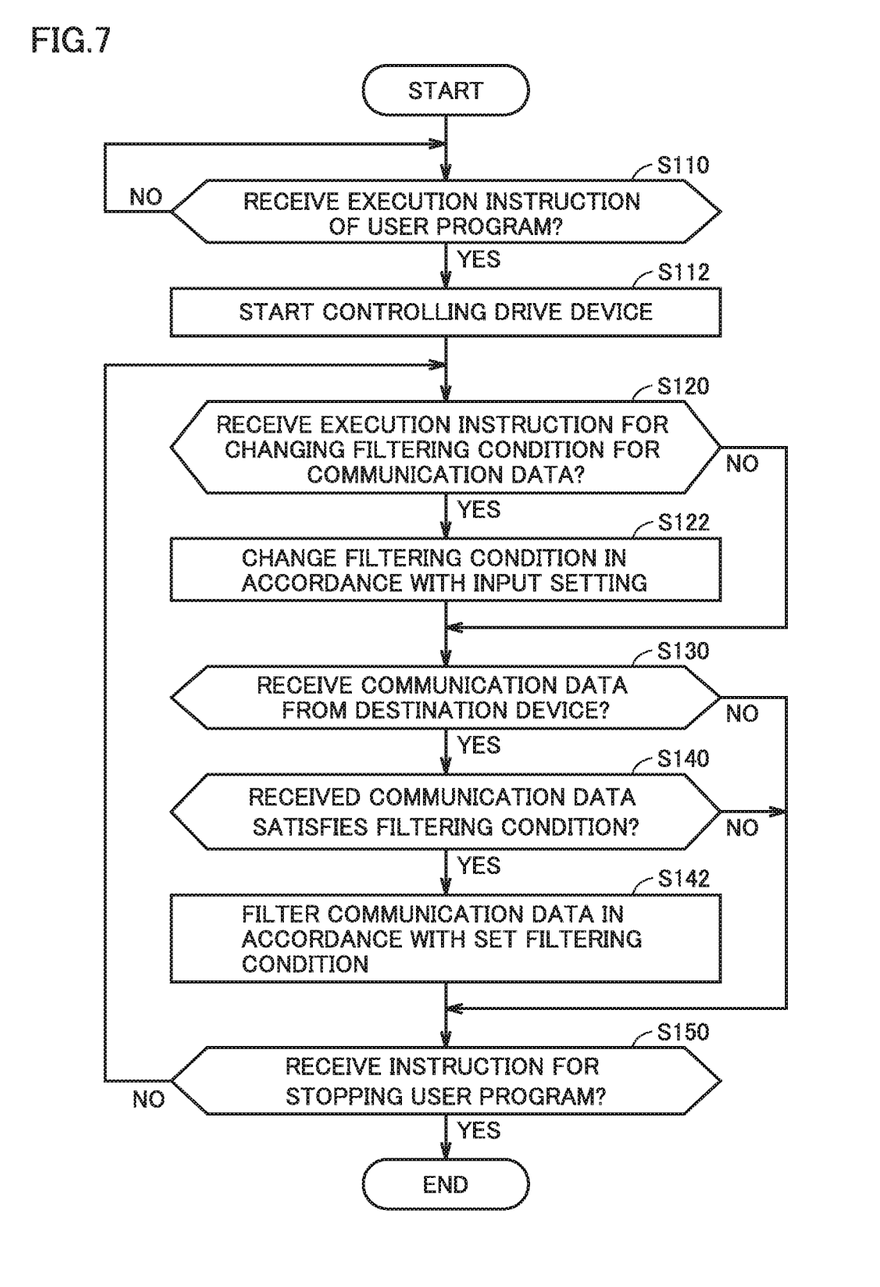
FIG. 7 is a flowchart showing a part of the process executed by a controller according to an embodiment.

The control structure of controller 100 will now be described with reference to FIG. 7. FIG. 7 is a flowchart showing a part of the process executed by controller 100. The process shown in FIG. 7 is implemented by processor 102 of controller 100 executing user program 110. In another aspect, a part or all of the process may be executed by circuit elements or other hardware.

At step S110, processor 102 determines whether or not an execution instruction of user program 110 has been received. When determining that an execution instruction of user program 110 has been received (YES at step S110), processor 102 switches the control to step S112. Otherwise (NO at step S110), processor 102 executes the process at step S110 again.

At step S112, processor 102 executes an initialization process, such as establishment of communication with information processing device 200 and drive device 300. After that, processor 102 executes control function 150 (see FIG. 1) defined in user program 110, and starts controlling drive device 300.

At step S120, processor 102 determines whether or not an execution instruction for changing the filtering condition for communication data has been received. By way of example, in response to "True" (=ON) being input to input part 155A (see FIG. 3) in filtering function 152 defined in user program 110 described above, processor 102 determines that an execution instruction for changing the filtering condition has been received. When determining that an execution instruction for changing the filtering condition for communication data has been received (YES at step S120), processor 102 switches the control to step S122. Otherwise (NO at step S120), processor 102 switches the control to step S130.

At step S122, processor 102 changes the filtering condition in accordance with the setting input to filtering function 152 in user program 110. By way of example, processor 102 sets the filtering condition in accordance with the values input to input parts 155B to 155F as shown in FIG. 3. The method for changing the filtering condition has already been described in FIG. 3, and thus the description thereof is not repeated.

At step S130, processor 102 determines whether or not any communication data has been received from a destination device. When determining that communication data has been received from a destination device (YES at step S130), processor 102 switches the control to step S140. Otherwise (NO at step S130), processor 102 switches the control to step S150.

At step S140, processor 102 determines whether or not the communication data received at step S130 satisfies the currently set filtering condition. By way of example, processor 102 extracts, from the communication data received as comparison information on the filtering condition, at least one of: the identification information (e.g., IP address or MAC address) of the source device, the port number of the destination device, the communication protocol used when the communication data was received, the identification information (e.g., IP address or MAC address) of the destination device, the port number of the source device, and the communication protocol used when the communication data was transmitted. At this time, processor 102 may further specify, as one of the comparison information, the communication direction of the communication data from the identification information of the destination device or source device. When the comparison information matches the filtering condition (YES at step S140), processor 102 switches the control to step S142. Otherwise (NO at step S140), processor 102 switches the control to step S150.

At step S142, processor 102 filters the communication data in accordance with the operation mode that is set in filtering function 152. As described in FIG. 3, when "pass" is set for input part 155B of filtering function 152, processor 102 allows passage of only the communication data that satisfies the filtering condition, and filters out other communication data. On the other hand, when "block" is set for input part 155B of filtering function 152, processor 102 filters out only the communication data that satisfies the filtering condition, and allow passage of other communication data.

At step S150, processor 102 determines whether or not an instruction for stopping user program 110 has been received. When determining that an instruction for stopping user program 110 has been received (YES at step S150), processor 102 ends the process shown in FIG. 7. Otherwise (NO at step S150), processor 102 returns the control to step S120.

<H. Conclusion>

As described above, user program 110 created by the user includes control function 150 and filtering function 152. Control function 150 outputs a control instruction to drive device 300 in accordance with the defined details of control. Filtering function 152 switches whether or not to transmit communication data received from a source device to a destination device, in accordance with the setting for filtering condition that is input during execution of user program 110.

Since filtering function 152 is defined to receive input of the setting for filtering condition, controller 100 can change the filtering condition for communication data without stopping drive device 300.

<I. Additional Description>

As described above, the present embodiment includes the following disclosure.

[Configuration 1]

A control device (100) that controls a drive device (300), the control device (100) comprising:

a physical first communication port (100P1) that connects to a first network (N1) to which an information processing device (200) belongs;

a physical second communication port (100P2) that connects to a second network (N2) to which the drive device (300) belongs; and a storage device (108) that stores a user program (110) created for controlling the drive device (300), the user program (110) including a filtering function for switching a filtering condition in accordance with a setting for the filtering condition that is input during execution of the user program (110), the filtering condition being used for determining whether or not to transmit communication data received from one device to another device, the one device being one of the drive device (300) and the information processing device (200), the other device being the other of the drive device (300) and the information processing device (200).

[Configuration 2]

The control device according to configuration 1, wherein the setting for the filtering condition includes a setting for specifying whether or not to execute a process for changing the filtering condition.

[Configuration 3]

The control device according to configuration 1 or 2, wherein
the setting for the filtering condition includes a setting for specifying an operation mode of the filtering function when the filtering condition is satisfied, and
the operation mode includes
a mode in which only the communication data received from the one device is transmitted to the other device, and
a mode in which the communication data received from the one device is not transmitted to the other device.

[Configuration 4]

The control device according to configuration 1, wherein the setting for the filtering condition includes a setting for specifying whether transmission of the communication data received from the drive device (300) is to be filtered, or the communication data received from the information processing device (200) is to be filtered.

[Configuration 5]

The control device according to any one of configurations 1 to 4, wherein the setting for the filtering condition includes a setting for specifying a communication protocol for the communication data to be filtered.

[Configuration 6]

The control device according to any one of configurations 1 to 5, wherein the setting for the filtering condition includes at least one of
a setting for specifying a destination of the communication data received from the one device, and
a setting for specifying a source of the communication data received from the one device.

[Configuration 7]

A control method for a control device (100) that controls a drive device (300), the control method comprising:

a step (S112) of establishing communication with an information processing device (200) that belongs to a first network (N1);

a step (S112) of establishing communication with the drive device (300) that belongs to a second network (N2);

a step (S112) of executing, by the control device (100), a user program (110) created for controlling the drive device (300); and a step (S122) of switching, by the user program (110), a filtering condition in accordance with a setting for the filtering condition that is input during execution of the user program (110), the filtering condition being used for determining whether or not to transmit communication data received from one device to another device, the one device being one of the drive device (300) and the information processing device (200), the other device being the other of the drive device (300) and the information processing device (200).

[Configuration 8]

A control program for a control device (100) that controls a drive device (300), the control program causes the control device to execute:

a step (S112) of establishing communication with an information processing device (200) that belongs to a first network (N1);

a step (S112) of establishing communication with the drive device (300) that belongs to a second network (N2);

a step (S112) of executing a user program (110) created for controlling the drive device (300); and a step (S122) of switching a filtering condition in accordance with a setting for the filtering condition that is input during execution of the user program (110), the filtering condition being used for determining whether or not to transmit communication data received from one device to another device, the one device being one of the drive device (300) and the information processing device (200), the other device being the other of the drive device (300) and the information processing device (200).

It should be understood that the embodiment disclosed herein is by way of example in every respect and not by way of limitation. The scope of the present invention is defined not by the above description but by the terms of the claims, and is intended to include any modification within the meaning and scope equivalent to the terms of the claims.

REFERENCE SIGNS LIST

1: FA system; 100: controller; 100P1, 100P2, 310P1, 310P2, 320P1, 320P2: communication port; 102: processor; 104: chip set; 106: main memory; 108: storage device; 109: control program; 110: user program; 111: system program; 112: USB interface; 114: memory card interface; 116: memory card; 118: network interface; 120: internal bus controller; 130: field network controller; 150: control function; 152: filtering function; 155A, 155B, 155C, 155D, 155E, 155F: input part; 157A, 157B, 157C, 157D: output part; 200: information processing device; 200A: support device; 200B: server device; 200C: display; 300: drive device; 305: hub; 310, 320: remote IO device; 315: image sensor; 325: arm robot

The invention claimed is:

1. A control device that controls an industrial drive device provided in a factory automation system, the control device comprising:

a physical first communication port that connects to a first network to which an information processing device belongs;

a physical second communication port that connects to a second network to which the industrial drive device belongs; and a storage device that stores a user program created for controlling the industrial drive device, wherein the user program, when executed, causes the control device to perform operations comprising:

a controlling function for outputting a control instruction to the industrial drive device in accordance with a control program defined in the user program; and a filtering function for switching a filtering condition in accordance with a setting for the filtering condition that is input during execution of the user program, the filtering condition being used for determining whether or not to transmit communication data received from one device to another device, the one device being one of the industrial drive device and the information processing device, the other device being the other of the industrial drive device and the information processing device, and the setting for the filtering condition comprises a setting for specifying whether transmission of the communication data received from the industrial drive device is to be filtered, or the communication data received from the information processing device is to be filtered.

2. The control device according to claim 1, wherein the setting for the filtering condition further comprises a setting for specifying whether or not to execute a process for changing the filtering condition.

3. The control device according to claim 1, wherein the setting for the filtering condition further comprises a setting for specifying an operation mode of the filtering function when the filtering condition is satisfied, and the operation mode includes a mode in which only the communication data received from the one device is transmitted to the other device, and a mode in which the communication data received from the one device is not transmitted to the other device.

4. The control device according to claim 1, wherein the setting for the filtering condition further comprises a setting for specifying a communication protocol for the communication data to be filtered.

5. The control device according to claim 1, wherein the setting for the filtering condition further comprises at least one of:

a setting for specifying a destination of the communication data received from the one device; and a setting for specifying a source of the communication data received from the one device.

6. A control method for a control device that controls an industrial drive device provided in a factory automation system, the control method comprising:

establishing communication with an information processing device that belongs to a first network;

establishing communication with the industrial drive device, which belongs to a second network;

executing, by the control device, a user program created for controlling the industrial drive device;

outputting, by execution of the user program by the control device, a control instruction to the industrial drive device in accordance with a control program defined in the user program;

switching, by the user program, a filtering condition in accordance with a setting for the filtering condition that is input during execution of the user program, the filtering condition being used for determining whether or not to transmit communication data received from one device to another device, the one device being one of the industrial drive device and the information processing device, the other device being the other of the industrial drive device and the information processing device, wherein the setting for the filtering condition comprises a setting for specifying whether transmission of the communication data received from the industrial drive device is to be filtered, or the communication data received from the information processing device is to be filtered.

7. A non-transitory computer-readable storage medium storing a control program for a control device that controls an industrial drive device provided in a factory automation system, the control program, when read and executed, causes the control device to perform operations comprising:

establishing communication with an information processing device that belongs to a first network;
establishing communication with the industrial drive device that belongs to a second network;
executing a user program created for controlling the drive device;
outputting, by the user program, a control instruction to the industrial drive device in accordance with a control program defined in the user program;
switching, by the user program, a filtering condition in accordance with a setting for the filtering condition that is input during execution of the user program, the filtering condition being used for determining whether or not to transmit communication data received from one device to another device, the one device being one of the industrial drive device and the information processing device, the other device being the other of the drive device and the information processing device, wherein
the setting for the filtering condition comprises a setting for specifying whether transmission of the communication data received from the industrial drive device is to be filtered, or the communication data received from the information processing device is to be filtered.

8. The control device according to claim 1, wherein the communication data received from the industrial drive device comprises a status of the industrial drive device controlled in accordance with the control instruction.

9. The control device according to claim 1, wherein the factory automation system controls a plurality of working processes on a workpiece, and the setting for the filtering condition is changed depending on switching between the working processes.

10. The control method according to claim 6, wherein the setting for the filtering condition further comprises a setting for specifying whether or not to execute a process for changing the filtering condition.

11. The control method according to claim 6, wherein
the setting for the filtering condition further comprises a setting for specifying an operation mode of the filtering function when the filtering condition is satisfied, and the operation mode includes a mode in which only the communication data received from the one device is transmitted to the other device, and a mode in which the communication data received from the one device is not transmitted to the other device.

12. The control method according to claim 6, wherein the setting for the filtering condition further comprises a setting for specifying a communication protocol for the communication data to be filtered.

13. The control method according to claim 6, wherein the setting for the filtering condition further comprises at least one of:
a setting for specifying a destination of the communication data received from the one device; and
a setting for specifying a source of the communication data received from the one device.

14. The control method according to claim 6, wherein the communication data received from the industrial drive device comprises a status of the industrial drive device controlled in accordance with the control instruction.

15. The control method according to claim 6, wherein the factory automation system controls a plurality of working processes on a workpiece, and the setting for the filtering condition is changed depending on switching between the working processes.

16. The non-transitory computer-readable storage medium according to claim 7, wherein the setting for the filtering condition further comprises a setting for specifying whether or not to execute a process for changing the filtering condition.

17. The non-transitory computer-readable storage medium according to claim 7, wherein the setting for the filtering condition further comprises a setting for specifying an operation mode of the filtering function when the filtering condition is satisfied, and the operation mode includes a mode in which only the communication data received from the one device is transmitted to the other device, and a mode in which the communication data received from the one device is not transmitted to the other device.

18. The non-transitory computer-readable storage medium according to claim 7, wherein the setting for the filtering condition further comprises a setting for specifying a communication protocol for the communication data to be filtered.

19. The non-transitory computer-readable storage medium according to claim 7, wherein the setting for the filtering condition further comprises at least one of:
a setting for specifying a destination of the communication data received from the one device; and
a setting for specifying a source of the communication data received from the one device.

* * * * *